(12) United States Patent
Poulin et al.

(10) Patent No.: US 8,004,142 B2
(45) Date of Patent: Aug. 23, 2011

(54) STATOR ASSEMBLY FOR ELECTRIC MACHINES

(75) Inventors: Stephane Poulin, Sainte-Julie (CA); Ruisheng Shi, Montreal (CA); Sebastien Bigras, Longueil (CA); Gabriel Rakotonirina, Trois-Rivieres (CA); Steve Fleming, Boucherville (CA); Martin Houle, Laval (CA)

(73) Assignee: TM4 Inc., Quebec (CA)

( * ) Notice: Subject to any disclaimer, the term of this patent is extended or adjusted under 35 U.S.C. 154(b) by 227 days.

(21) Appl. No.: 12/368,748

(22) Filed: Feb. 10, 2009

(65) Prior Publication Data

US 2009/0236919 A1 Sep. 24, 2009

Related U.S. Application Data

(60) Provisional application No. 61/064,021, filed on Feb. 11, 2008.

(51) Int. Cl.
*H02K 1/06* (2006.01)
*H02K 15/12* (2006.01)

(52) U.S. Cl. ............. 310/216.079; 310/44; 310/54; 310/52; 310/58; 310/216.055; 310/216.088; 310/216.096

(58) Field of Classification Search ............ 310/43, 310/44, 52, 54, 58, 60 R–63, 216.051, 216.079–216.089, 216.096, 310/216.074; H02K 1/06, 15/12
See application file for complete search history.

(56) References Cited

U.S. PATENT DOCUMENTS

| 3,914,859 | A | * | 10/1975 | Pierson .......................... 29/596 |
| 6,057,621 | A | * | 5/2000 | Suzuki et al. .......... 310/216.079 |
| 6,081,059 | A | * | 6/2000 | Hsu ................................ 310/179 |
| 6,157,111 | A |   | 12/2000 | Asao |
| 6,163,952 | A | * | 12/2000 | Takehara ........................ 29/598 |
| 6,389,679 | B1| * | 5/2002 | Kliman et al. .................. 29/596 |
| 6,448,685 | B1| * | 9/2002 | Mayer et al. .......... 310/216.051 |
| 6,598,288 | B1| * | 7/2003 | Takehara ........................ 29/598 |
| 6,681,476 | B2| * | 1/2004 | Mayer et al. .................... 29/596 |
| 6,888,284 | B2| * | 5/2005 | Eggers et al. .......... 310/216.074 |
| 7,084,545 | B2| * | 8/2006 | Happel .................. 310/216.074 |
| 2002/0140312 | A1 | * | 10/2002 | Ikeda et al. ................. 310/217 |
| 2004/0012272 | A1 | * | 1/2004 | Houle et al. .................... 310/54 |
| 2004/0155552 | A1 | * | 8/2004 | Happel ........................ 310/218 |
| 2005/0035673 | A1 | * | 2/2005 | Lafontaine et al. ............ 310/58 |
| 2006/0038450 | A1 | * | 2/2006 | Matin et al. .................... 310/58 |
| 2006/0238038 | A1 | * | 10/2006 | Izquierdo et al. .............. 310/44 |
| 2009/0236919 | A1 | * | 9/2009 | Poulin et al. ................... 310/44 |

FOREIGN PATENT DOCUMENTS

| CA | 2 337 042 | 11/2000 |
| CA | 2 486 922 | 1/2004 |

* cited by examiner

*Primary Examiner* — Quyen Leung
*Assistant Examiner* — John K Kim
(74) *Attorney, Agent, or Firm* — Fay Kaplun & Marcin, LLP (57) ABSTRACT

A stator assembly is provided with detachable teeth that are made of magnetic powder material. The teeth are so configured and sized as to be interconnected to a core body of the stator with pre-formed coils that are positioned between adjacent teeth.

15 Claims, 7 Drawing Sheets

FIG_1

FIG. 7

STATOR ASSEMBLY FOR ELECTRIC MACHINES

PRIORITY CLAIM

This application claims the benefit of U.S. Provisional Patent Application Ser. No. 61/064,021 Filed on Feb. 11, 2008 the specification of which is expressly incorporated herein, in its entirety, by reference.

FIELD

The present invention generally relates to electric machines. More specifically, the present invention is concerned with a stator assembly for an electric machine.

BACKGROUND

Electric machines such as electric motors and generators are well known in the art. They are usually provided with a stator and a rotor coaxially mounted to the stator so as to rotate thereabout.

Some permanent magnet electric machines are provided with an internal stator and an external rotor generally enclosing the stator. When this is the case, the stator has a generally cylindrical body and coils are so mounted to the cylindrical body as to produce an outwardly projecting magnetic field that interacts with the externally provided rotor.

Conventionally, stator assemblies are made of a stack of laminations that are provided with outwardly facing slots allowing coils to be formed therein. However, when rectangular wire is used to form the coils, the coils are generally formed prior to their insertion in the stator slots. This may cause problems since the pre-formed coils may have to be slightly deformed to be inserted in the slots, which increases the production costs and may damage the coils during the insertion, leading to potential premature stator failure.

DETAILED DESCRIPTION

In accordance with an illustrative embodiment, there is provided a stator for an electric machine comprising:

a generally cylindrical core body having an external surface provided with longitudinal grooves;

a plurality of teeth having a proximate portion so configured and sized as to be insertable in a corresponding longitudinal groove of the core body;

a plurality of coils provided between the plurality of teeth; and a wrapping layer so configured as to enclose the plurality of teeth when assembled to the core body.

In accordance with an other aspect, there is provided a method to assemble a stator of an electric machine the stator including a generally cylindrical core body having an external surface provided with longitudinal grooves, a plurality of teeth having a proximate portion so configured and sized as to be insertable in a corresponding longitudinal groove, a plurality of coils provided between the plurality of teeth; and a wrapping layer so configured as to enclose the plurality of teeth when assembled to the core body, the assembly method comprising:

mounting the plurality of teeth to the wrapping layer;

positioning the plurality of coils between the plurality of teeth; and wrapping the wrapping layer, teeth and coils onto the core body by inserting the proximate portion of the teeth into the longitudinal grooves.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

Other objects, advantages and features of the present invention will become more apparent upon reading of the following non-restrictive description of illustrative embodiments thereof, given by way of example only with reference to the accompanying drawings.

Generally stated, illustrative embodiments are concerned with a stator assembly provided with detachable teeth that are made of magnetic powder material, for example, sintered magnetic flakes. The teeth are so configured and sized as to be interconnected to a core body of the stator while pre-formed coils are positioned between adjacent teeth. A cooling assembly may be secured to, or be part of, the core body.

Turning now to FIGS. 1 to 4 of the appended drawings, a stator 10 according to a first illustrative embodiment will be described.

Figure 1:
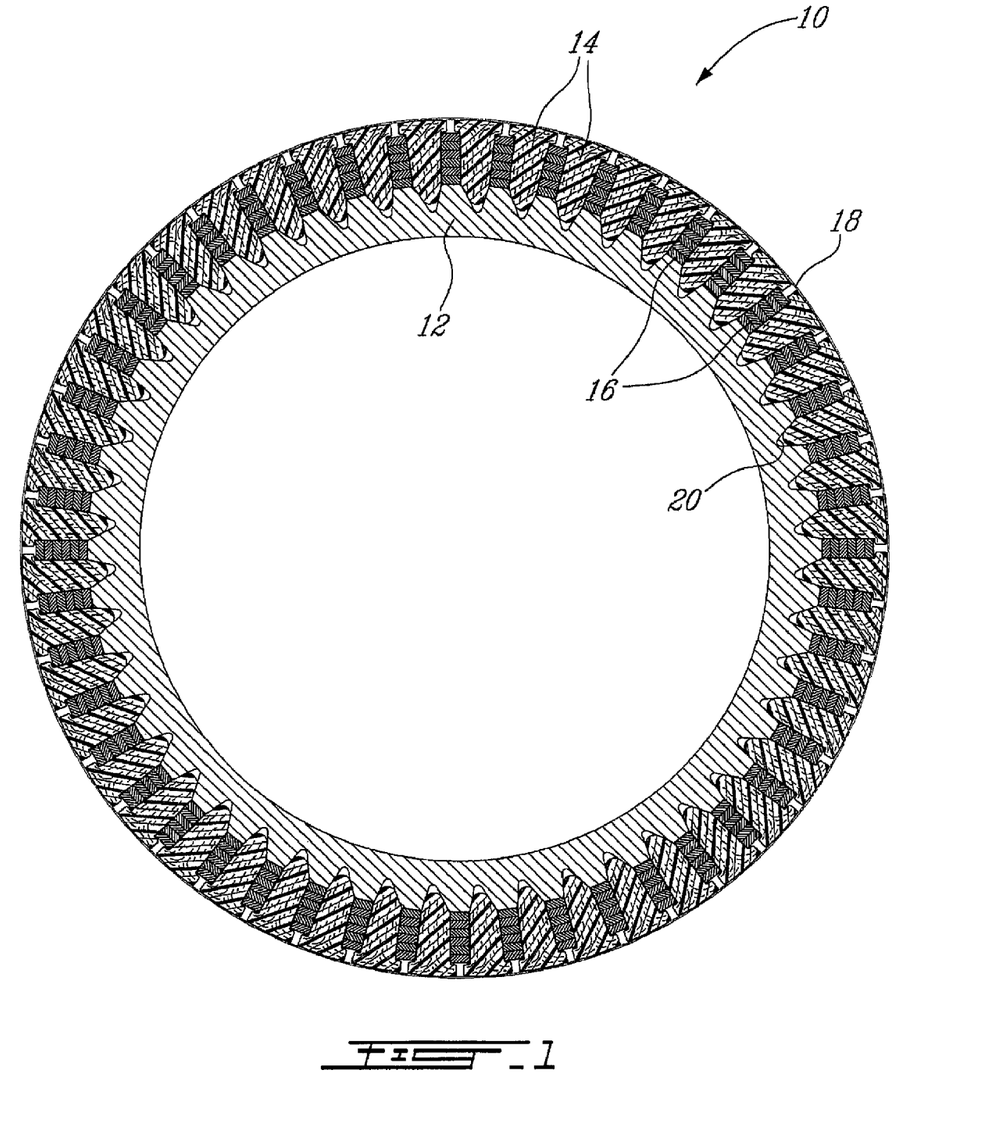
FIG. 1 is a schematic side sectional view of a stator according to a first illustrative embodiment.

As can be seen from FIG. 1, the stator 10 includes a core body 12, a plurality of detachable teeth 14, a plurality of pre-formed coils 16 and a wrapping layer 18.

The core body 12 is generally cylindrical and includes externally provided generally V-shaped longitudinal grooves 20 that are non-symmetric. The core 12 is made or magnetically susceptible material such as, for example, steel. The core body 12 may be conventionally formed of a plurality of stacked laminations.

Figure 2:
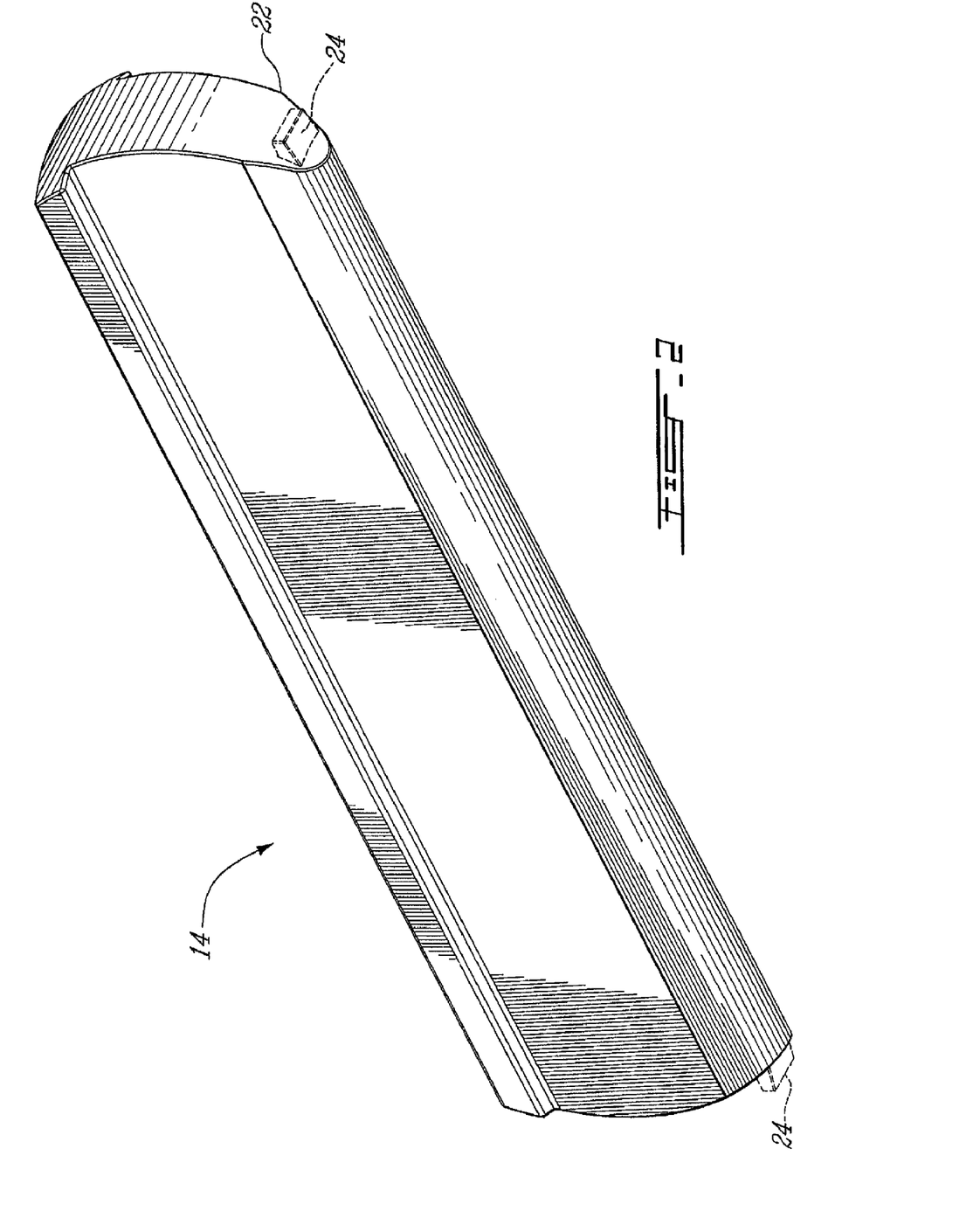
FIG. 2 is a perspective view of one of the tooth that is part of the stator of FIG. 1.

FIG. 2 illustrates one of the teeth 14. As can be seen from this Figure the tooth 14 has a generally T-shaped cross-section and includes a generally non-symmetric rounded V-shaped end 22 configured and sized to enter the external grooves 20 of the core body 12 as will be explained hereinbelow.

The tooth 14 is made of magnetic powder material that may be shaped to the desired configuration. The magnetic powder material may for example be sintered magnetic flakes or SMC-Somaloy™ 500. Since these powders are believed well known in the art, they will not be further discussed herein.

Optionally, the rounded V-shaped end 22 of the tooth 14 is provided with projections 24 at both longitudinal ends thereof. These projections are illustrated in dashed lines in FIG. 2. The purpose of these optional projections 24 will be described hereinbelow.

Returning to FIG. 1, the pre-formed coils 16 rest on the flat spaces between the grooves 20 of the core body 12 and are positioned between adjacent teeth 14. While not shown in the appended drawings, an electrical insulating layer, for example insulating paper, may be conventionally positioned between the coils 16 and the rest of the stator.

Figure 3:
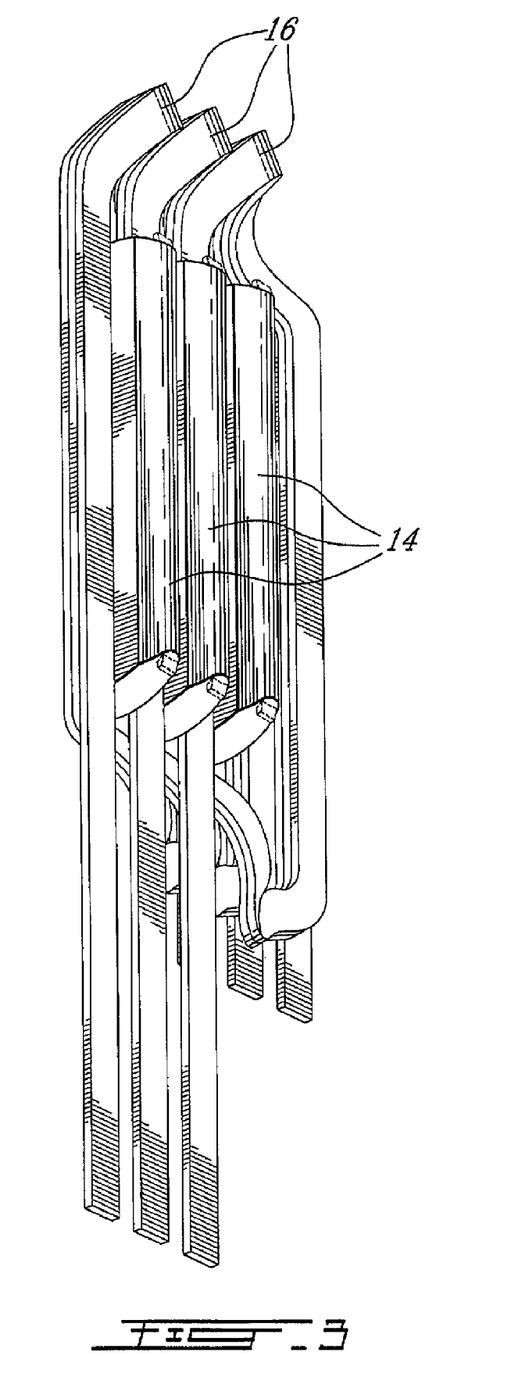
FIG. 3 is a perspective view of three tooth between which are mounted three pre-formed coils made of rectangular wire.

FIG. 3 illustrates three pre-formed coils 16 mounted between three adjacent teeth 14. It is to be noted that while coils forming a three-phase circuit are illustrated in FIG. 3, this is for illustration purpose only since other coil arrangements can be used.

Figure 4:
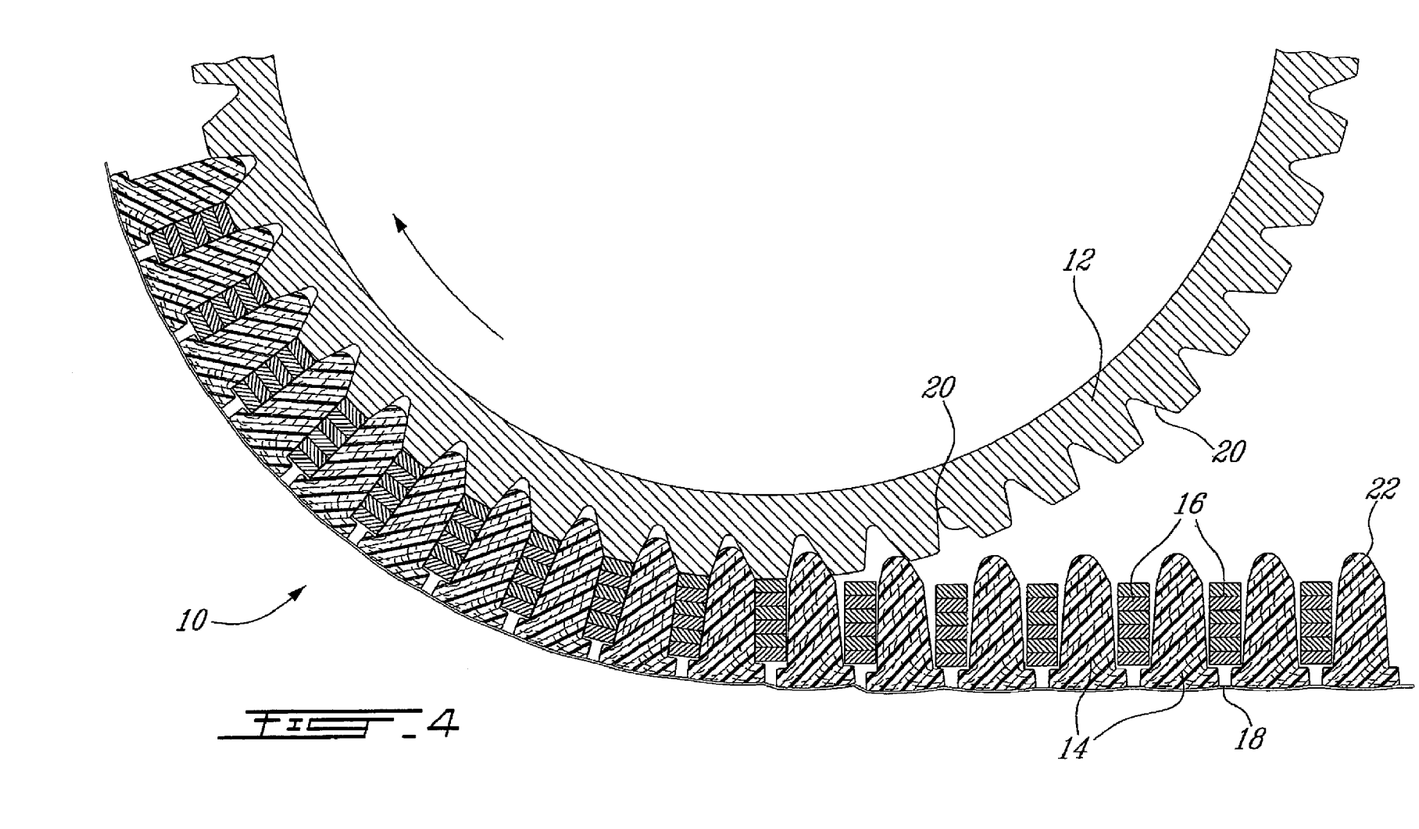
FIG. 4 is a side elevation view illustrating the assembly of the tooth to the body of the stator.

As can be seen from FIG. 4 of the appended drawings, the wrapping layer 18 is secured to the teeth 14 prior to their assembly to the core body 12. The wrapping layer 18 therefore has an adhesive portion adequate to properly maintain the teeth 14 in their predetermined position with respect to one another prior to assembly. The wrapping layer 18 is made of non-magnetically susceptible and flexible material.

The wrapping layer 18 could be replaced by other means to flexibly interconnect adjacent teeth 14 in their predetermined position. As a non-limiting example, the top portion of the teeth 14 could be clipped to a flexible plastic mat (not shown) that can optionally be removed after the stator assembly.

Alternatively, the wrapping layer could be made of magnetically susceptible material to therefore close the gaps between the teeth 14 when they are assembled to the body 12.

A method of assembly of the stator 10 will now be briefly described with reference to FIG. 4 of the appended drawings.

The first step is to properly position the teeth 14 onto the adhesive portion of the wrapping layer 18 which is laid flat. The distance separating the individual teeth 14 is selected to that the teeth 14 properly enclose the coils 16 when the assembly is done.

Then, the pre-formed coils 16 are mounted between the upstanding teeth 14 adhered, or otherwise mounted, to the wrapping layer 18.

The wrapping layer 18, teeth 14 and coils 16 assembly is then wrapped around the core body 12. This step is illustrated in FIG. 4 of the appended drawings. As can be seen from this figure, the core body 12 is turned clockwise onto the flatly laid teeth 14. From FIG. 4, it is clear how the non-symmetric V-shaped grooves 20 guide the rounded V-shape ends 22 of the teeth 14 therein.

Once all the grooves 20 have received their respective tooth 14, the free end (not shown) of the wrapping layer 18 is adhered to the other end of the wrapping layer, thereby forming a continuous cylindrical wrapping layer enclosing the teeth 14 and temporarily maintaining the stator together.

If the optional projection 24 are present on the longitudinal ends of each tooth 14, an optional circular tooth holding element (not shown) provided with apertures corresponding to the projections 24 is secured to the projections 24 at both longitudinal ends of the rotor 10 to help maintain the structural integrity of the stator.

The entire stator 10 is then impregnated with resin so that all the voids are filled and the stator 10 is held together. This step is believed well known to those skilled in the art and will therefore not be further described herein.

One skilled in the art will easily understand that the above-described assembly method could be done manually or could be partially or totally automated.

Figure 5:
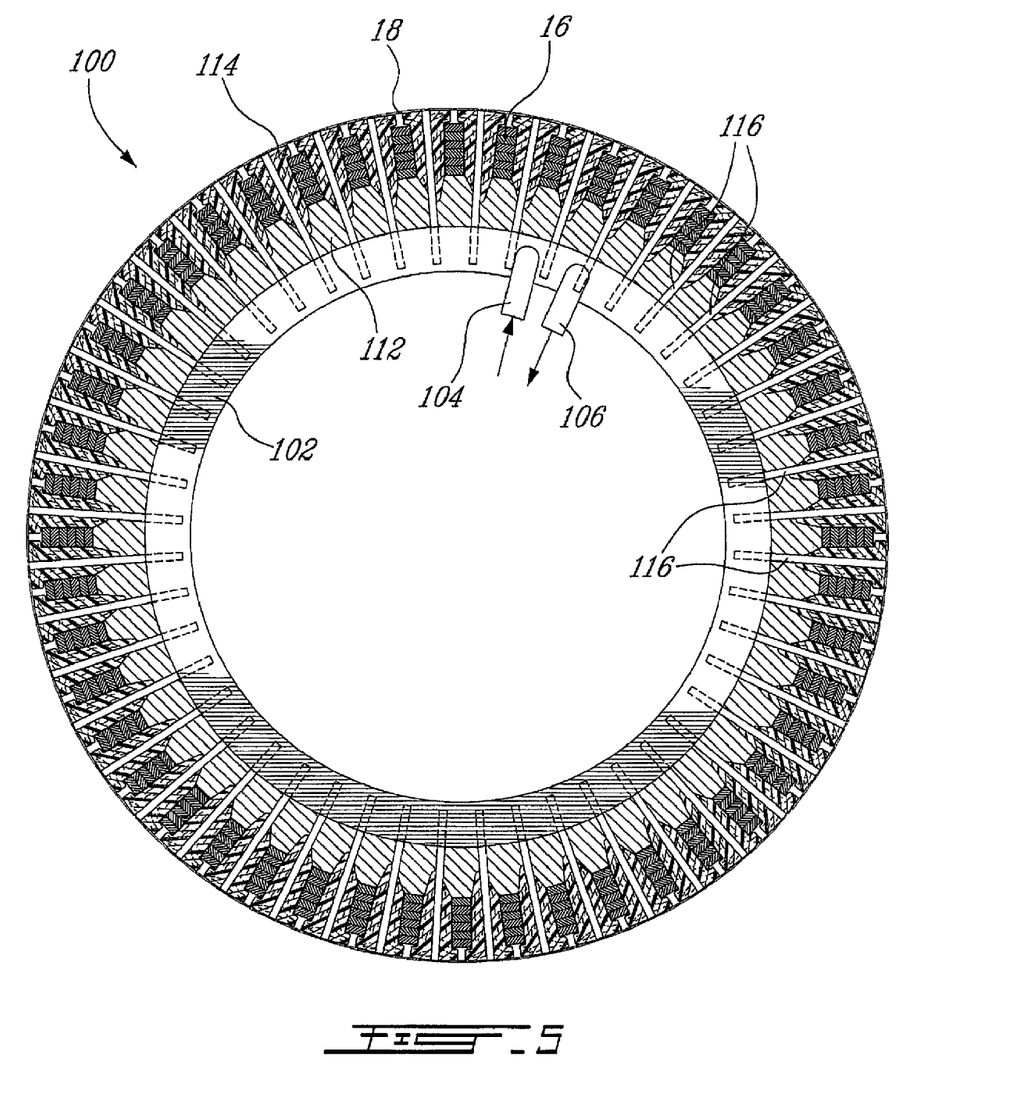
FIG. 5 is a schematic side sectional view of a stator according to a second illustrative embodiment.
Figure 6:
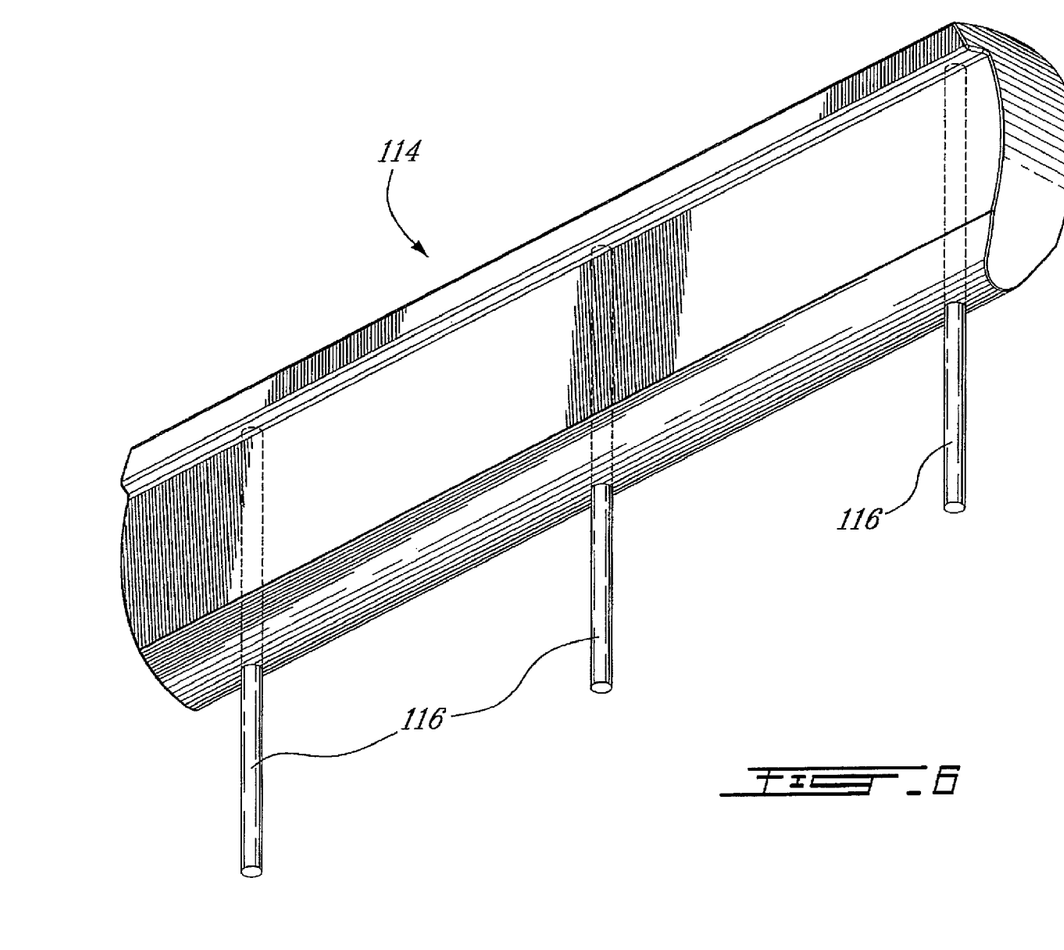
FIG. 6 is a perspective view of one of the tooth that is part of the stator of FIG. 5.

Turning now to FIGS. 5 and 6 of the appended drawings a stator 100 according to a second illustrative embodiment will be described. For concision purpose and since the stator 100 is similar to the stator 10 described hereinabove and illustrated in FIGS. 1 to 4, only the differences therebetween will be discussed hereinbelow.

The stator 100 of FIG. 5 is provided with a cooling assembly 102 provided inside the core body 112. The cooling assembly 102 includes a fluid inlet 104 and a fluid outlet 106. A cooling path (not shown) is provided in the cooling assembly 102 between the inlet 104 and the outlet 106. The cooling assembly 102 is also provided with a plurality of apertures provided on its outer surface to receive cooling projections of the teeth 114.

The cooling assembly 102 can be made of an aluminum alloy or of other material that may temporarily store heat.

Of course, while the cooling assembly 102 has been described hereinabove as a fluid cooling assembly, one skilled in the art will understand that an air cooling assembly, for example provided with internally projecting fins (not shown) and with a fan (not shown) could be used.

As can be better seen from FIG. 6, each tooth 114 includes three metallic cooling projections 116 whose function is to transfer the heat generated by the coils in the cooling assembly 102. Indeed, the heat transfer of the magnetic powder material forming the teeth 114 may be insufficient to properly transfer the heat generated by the stator to the cooling assembly via its contact with the core body 112.

Of course, the core body 112 is also provided with openings letting the metallic cooling projections therethrough.

Figure 7:
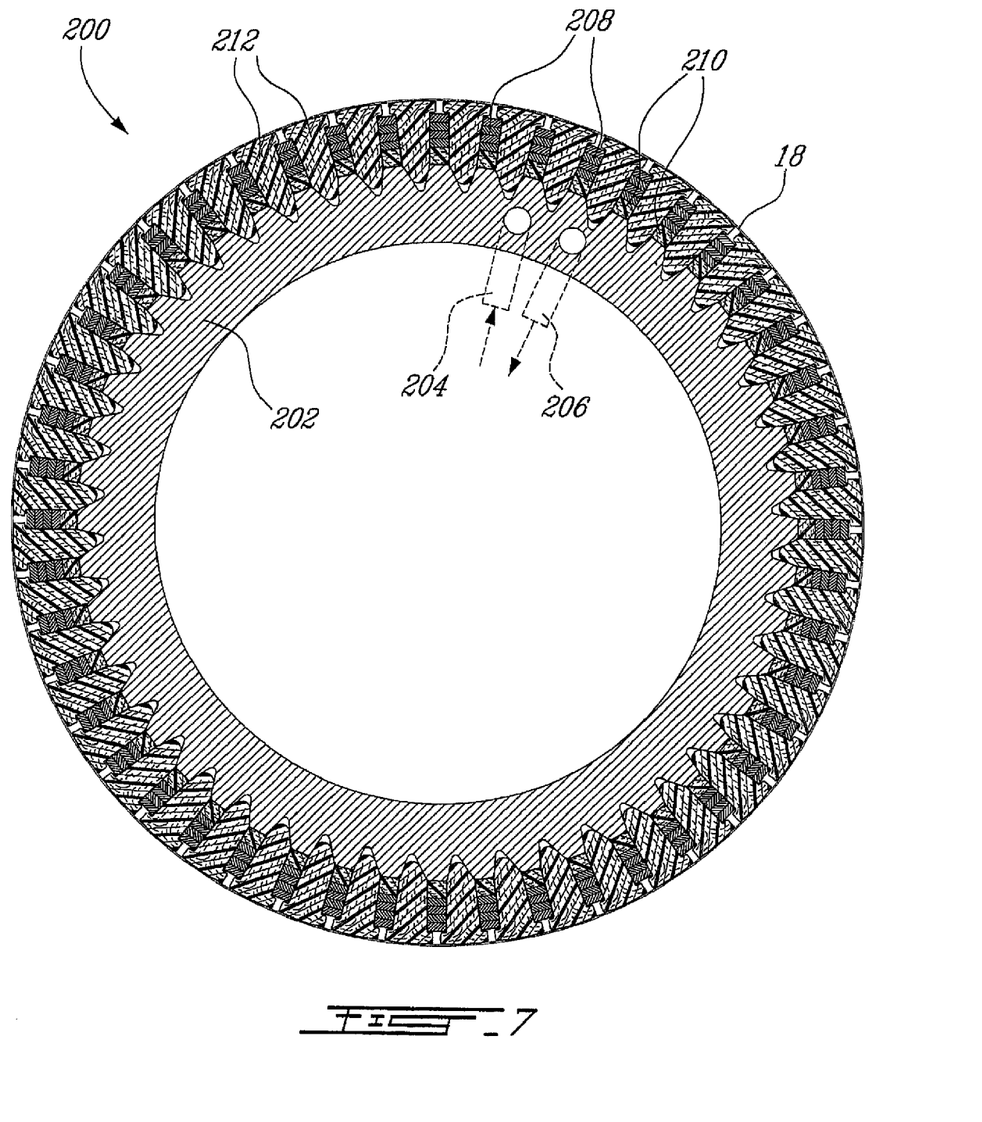
FIG. 7 is a schematic side sectional view of a stator according to a third illustrative embodiment.

Turning now to FIG. 7 of the appended drawings a stator 200 according to a third illustrative embodiment will be described. For concision purpose and since the stator 200 is similar to the stators 10 and 100 described hereinabove, only the differences therebetween will be discussed hereinbelow.

The stator 200 includes a thicker core body 202 that constitutes an integral cooling assembly provided with a fluid inlet 204, a fluid outlet 206 and a cooling fluid path (not shown) between the inlet and outlet. The core body can be made of an aluminum alloy or of other material that may temporarily store heat.

Since the core body 202 is made of non-magnetically susceptible material, another path for the magnetic field generated by the coils 208 is provided.

A square cross-sectional strip 210 of magnetic powder material having the same width as the coils 208 is provided between adjacent teeth 212. This creates a path for the magnetic field between adjacent teeth 212.

It is to be noted that when the magnetic powder material is more in the form of flakes, these flakes can be advantageously be oriented in the direction of the magnetic field that traverses them to lower the field losses in the material.

While the core body 202 has been described hereinabove as a fluid cooling assembly, one skilled in the art will understand that an air cooling assembly, for example provided with internally projecting fins (not shown) and with a fan (not shown) could be used.

One skilled in the art will understand that the features of the above described embodiments can be mixed. For example, the metallic cooling projections 116 of the teeth 114 of FIG. 6 could be added to the teeth 212 of FIG. 7.

One skilled in the art will understand that while rectangular wire is illustrated in the appended drawings, the wire forming the coils of the stator could have any cross section.

It is to be noted that the shape of the grooves 20 could be different from the shape illustrated herein, depending, for example on the shape of the teeth entering the grooves. For example, the grooves could be symmetrical.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. A stator for an electric machine, comprising:
   a generally cylindrical core body having an external surface provided with longitudinal generally non-symmetric V-shaped grooves;
   a plurality of teeth each having a generally T-shaped cross-section providing a single generally non-symmetric rounded V-shaped end so configured and sized as to be insertable in a corresponding longitudinal generally non-symmetric V-shaped groove of the core body;
   a plurality of coils provided between the plurality of teeth; and
   a wrapping layer so configured as to enclose the plurality of teeth when assembled to the core body.

2. A stator as recited in claim 1, wherein the core body is made of a plurality of stacked laminations.

3. A stator as recited in claim 1, wherein the cylindrical core body has a central aperture therein; the stator further comprising a cooling assembly mounted in the central aperture.

4. A stator as recited in claim 3, wherein the cooling assembly is an air cooling assembly.

5. A stator as recited in claim 3, wherein the cooling assembly is a liquid cooling assembly.

6. A stator as recited in claim 5, wherein the liquid cooling assembly is made of a thermally conductive material containing aluminum.

7. A stator as recited in claim 6, wherein the cooling assembly includes a liquid inlet and a liquid outlet.

8. A stator as recited in claim 1, wherein each tooth is made of magnetic powder material.

9. A stator as recited in claim 8, wherein the magnetic powder material includes sintered magnetic flakes.

10. A stator as recited in claim 1, wherein each tooth has at least one metallic cooling projection.

11. A stator as recited in claim 1, wherein each tooth has a projection provided at both longitudinal ends thereof.

12. A stator as recited in claim 1, further comprising longitudinal strips of magnetically conductive material provided between adjacent teeth.

13. A stator as recited in claim 12, wherein the core body is made of non-magnetically conductive material and includes an integral cooling assembly.

14. A stator as recited in claim 12, wherein each longitudinal strip is made of magnetic powder material.

15. A stator as recited in claim 14, wherein the magnetic powder material includes sintered magnetic flakes.

* * * * *